United States Patent
Krampe et al.

(10) Patent No.: US 7,360,472 B2
(45) Date of Patent: Apr. 22, 2008

(54) AUTOMATIC WIRE STRIPPER (76) Inventors: Franz Krampe, Bergstrasse 5 59387, Ascheberg-Herbern (DE); Stephan Krampe, Bergstrasse 5 59387, Ascheberg-Herbern (DE)

( * ) Notice: Subject to any disclaimer, the term of this patent is extended or adjusted under 35 U.S.C. 154(b) by 0 days.

(21) Appl. No.: 10/577,713

(22) PCT Filed: Sep. 24, 2004

(86) PCT No.: PCT/EP2004/010718

§ 371 (c)(1),
(2), (4) Date: Jun. 23, 2006

(87) PCT Pub. No.: WO2005/036707

PCT Pub. Date: Apr. 21, 2005

(65) Prior Publication Data

US 2006/0248991 A1    Nov. 9, 2006

(30) Foreign Application Priority Data

Oct. 9, 2003   (DE) ............................ 203 15 756 U
Mar. 12, 2004  (DE) ...................... 10 2004 012 152

(51) Int. Cl.
    *H02G 1/12* (2006.01)
(52) U.S. Cl. .......................................... 81/9.4; 81/9.43
(58) Field of Classification Search ........... 81/9.4–9.44
    See application file for complete search history.

(56) References Cited

U.S. PATENT DOCUMENTS

| 3,596,541 | A | * | 8/1971 | Bieganski | 81/9.43 |
| 4,329,891 | A | * | 5/1982 | Bieganski | 81/9.43 |
| 4,395,928 | A | * | 8/1983 | Undin et al. | 81/9.43 |
| 5,724,871 | A | * | 3/1998 | Wall | 81/9.43 |
| 6,079,296 | A | * | 6/2000 | Muromoto | 81/9.43 |

FOREIGN PATENT DOCUMENTS

DE          39 22 016 A1     7/1999

* cited by examiner

*Primary Examiner*—D S Meislin
(74) *Attorney, Agent, or Firm*—Milde & Hoffberg, LLP (57) ABSTRACT

An automatic wire stripper comprises a knife unit (40) having a knife holder (41) and a knife carriage (45) articulated on the knife holder; A clamping arm unit (30) is pivotally mounted on a clamping arm bearing (30). A handle lever unit (60) is pivotally connected to a housing base (20) on a handle lever bearing (61). An articulated lever (70) has a first and second articulated lever arm (72, 75) connected in a pivotable manner by an articulated lever center axis (73). The first articulated lever arm (72) is guided with a first articulated lever axis (71) in a guiding connecting link (32) of the clamping arm unit (30). The second articulated lever (75) is fixed in an articulated manner to the knife unit (40) with the articulated lever center axis (73) guided in the handle (60).

21 Claims, 7 Drawing Sheets

AUTOMATIC WIRE STRIPPER

This application is a 371 of PCT/EP04/10718, filed Sep. 24, 2004.

BACKGROUND OF THE INVENTION

The invention relates to automatic stripping pliers, in particular for flat cables.

Automatic stripping pliers that are used to strip the ends of an electrical cable from the insulating jacket are known from, for example, DE 39 22 016 C2. With it, the cable is placed between two knife elements that have their blades set against each other. The insulated cable is clamped next to the knives. By pulling the movable grip lever against the handgrip of the base housing, the knife elements are pressed into the insulation. With the continued grip movement, the knives are moved in the direction of the cable end, such that the insulation that has been severed by the knives is stripped off the electrical lead. All these processes can be accomplished with the known automatic stripping pliers in one single movement, namely the moving of the grip lever to the hand grip of the base housing. This significantly simplifies the stripping of electrical cables.

However, with the known stripping pliers only a certain length can be stripped from the end of the cable, because the knives are attached to arms that are connected in an articulated manner to one another, resulting in the distance from the knife to the articulated axis that is struck by the cable end as a maximum functional length. This distance is sufficient to strip the electrical lead at the end of the cable, which can then be inserted into respective terminals of electrical devices. However, it is not possible to remove the outer jacket of a multi-insulated electrical cable over a greater length, as is necessary, for example, to arrange individual wires at intact individual wire insulations in junction boxes, etc. While as a workaround, round wires can still be lead to the side out of the knife arms, kinking flat cables to the side is not possible such that with the known pliers the outer jacket cannot be removed to a greater length.

SUMMARY OF THE INVENTION

A principle objective of the invention, therefore, is to provide automatic stripping pliers which are capable of stripping any length of stripping a cable jacket, in particular of a flat cable.

This objective, as well as other objectives which will become apparent from the discussion that follows, are achieved, in accordance with the present invention, by providing wire stripping pliers that comprise at least one knife unit having at least one knife holder and a knife carriage articulated on the knife holder; a clamping arm unit with at least one clamping jaw disposed on the front end thereof; a housing base having an upper clamping arm in which the knife unit is displaceably guided; at least one clamping jaw; a clamping arm bearing whereon the clamping arm unit can be pivotally mounted; a handle lever unit which is pivotally connected to a housing base on a handle lever bearing and an articulated lever having a first and a second articulated lever arm which are connected to each other in a pivotable manner by an articulated lever center axis. The first articulated lever arm is guided with the first articulated lever axis in a guiding connecting link of the clamping arm unit; the second articulated lever is fixed in an articulated manner to the knife unit; and the articulated lever center axis is guided in the handle lever unit.

Significant to the invention is the elbow lever unit, which controls the entire movement sequence during stripping and affects a uniform force distribution in all phases of movement. Load peaks during operation of the elbow lever unit according to the invention have the effect that certain positions of the components are assumed or abandoned. It is not possible to destroy the cable being stripped or even the stripping pliers through carelessness or by applying too much force. Thus, many components of the stripping pliers can be manufactured economically of synthetic materials.

Feed-through of long cables can, for example, be enabled by a knife holder that is open towards the top and a base housing that is open towards the top. Preferably, however, the knife holder and/or the knife carriage exhibit, at least in the area of the articulated axis, a U-shaped cross-section. This forms a cable feed-through channel between the knife carriage and the knife holder.

To reduce the friction forces, and with it the actuating forces to be applied by the user, the center axis of the elbow lever should be made rollable in the elbow lever axis guide groove via an elbow lever guide roll.

In preferred embodiments, the clamping arm unit exhibits at its bottom side a guide link, where the knife unit is guided via a knife unit guide roll. The guide link is provided with at least one locking notch. The guide link controls the movement of the knife unit in the clamping arm unit. In addition, the locking notch provides a fixed support for the elbow lever unit in a first phase of movement.

In one preferred embodiment, the knife unit's guide roll is furthermore supported at the receiving joint of the spring, such that the pressing force transferred by the spring unit presses directly onto the knife unit's guide roll and if applicable presses it into a locking notch.

Preferably, the end axis of the second elbow lever is located in the articulated axis of the knife unit, such that a force vector acting from the elbow lever unit onto the second elbow lever end axis affects only a translatory movement of the knife unit but not an opening or closing of the knife unit.

The knife carriage and/or the knife holder are preferably provided with replaceable knife elements in order to easily replace dull blades.

The upper clamping arm and/or the clamping arm unit can be provided with replaceable clamping jaws such that not only damaged clamping jaws can be replaced but also special clamping jaws can be employed that are matched to the respective cable type processed by the stripping pliers.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-7 of the drawings. Identical elements in the various figures are designated with the same reference numerals.

Figure 1:
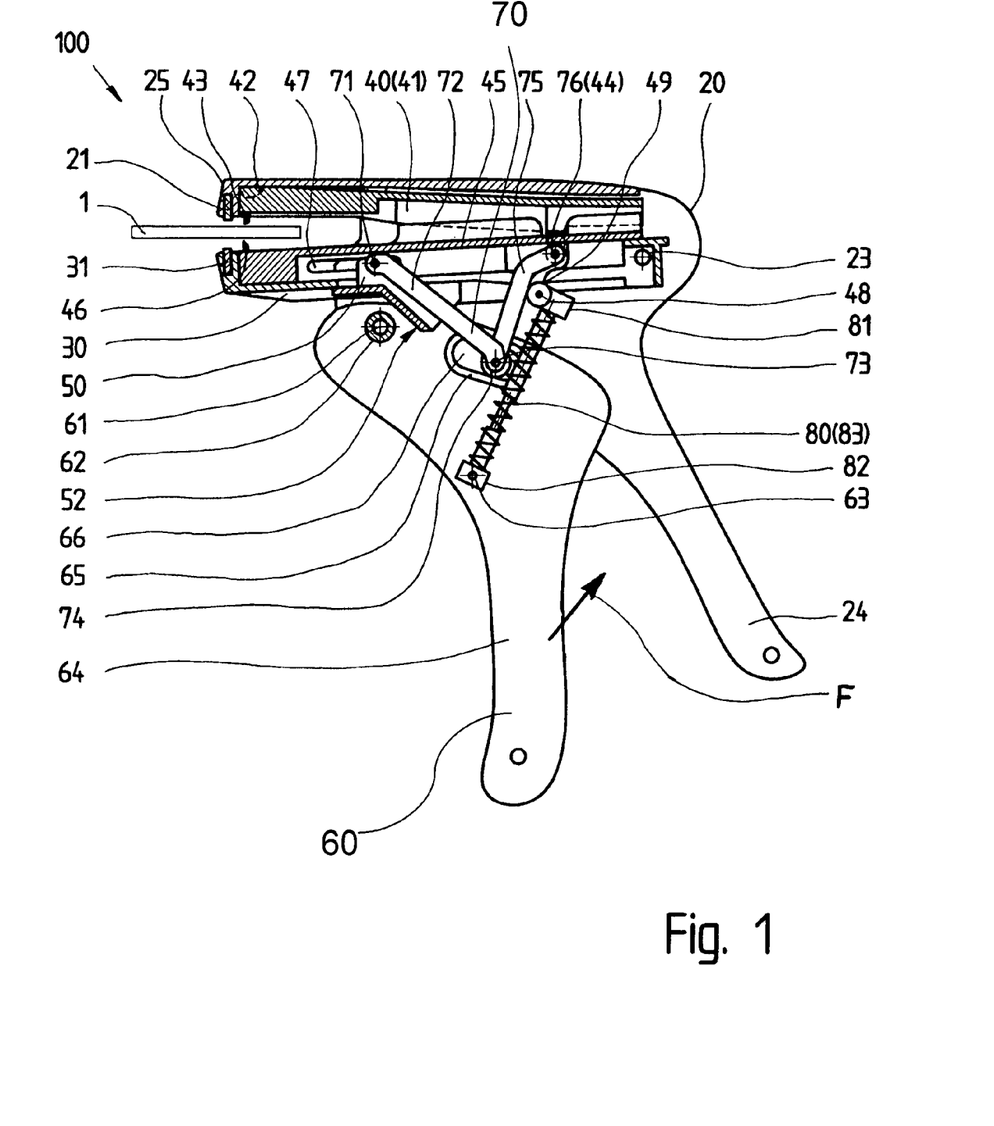
FIGS. 1 to 3 are cross-sectional side views of the stripping pliers according to the invention at various operational positions.

FIG. 1 shows a side view of a preferred embodiment of stripping pliers 100 according to the invention. Essentially, it is comprised of:
- a base housing 20,
- a clamping arm unit 30,
- a knife unit 40,
- a stop element 50,
- a handle lever element 60,
- an elbow lever unit 70, and
- a spring element 80.

At its upper end, the base housing 20 ends with an upper clamping arm 25 with a clamping jaw 21 located at its front end. A handgrip section 24 is formed downwards.

Connected with the base housing 20 in a movable manner are:
- the clamping arm unit 30 via the articulated clamping arm bearing 23, and
- the handle lever unit 60 via the articulated handle lever joint 61.

The length of the clamping arm unit 30 is selected such that the free end is approximately opposite to the end of the upper clamping arm 25. Another clamping jaw 31 is located at the free end and is located opposite the clamping jaw 21 of the base housing 20. The clamping arm unit 30 is designed such that it receives the knife carriage 45 as the lower partial element of the knife unit 40, whereby the knife carriage 45 is supported in it across a portion of the length of the clamping arm unit 30 in a movable fashion.

Figure 5:
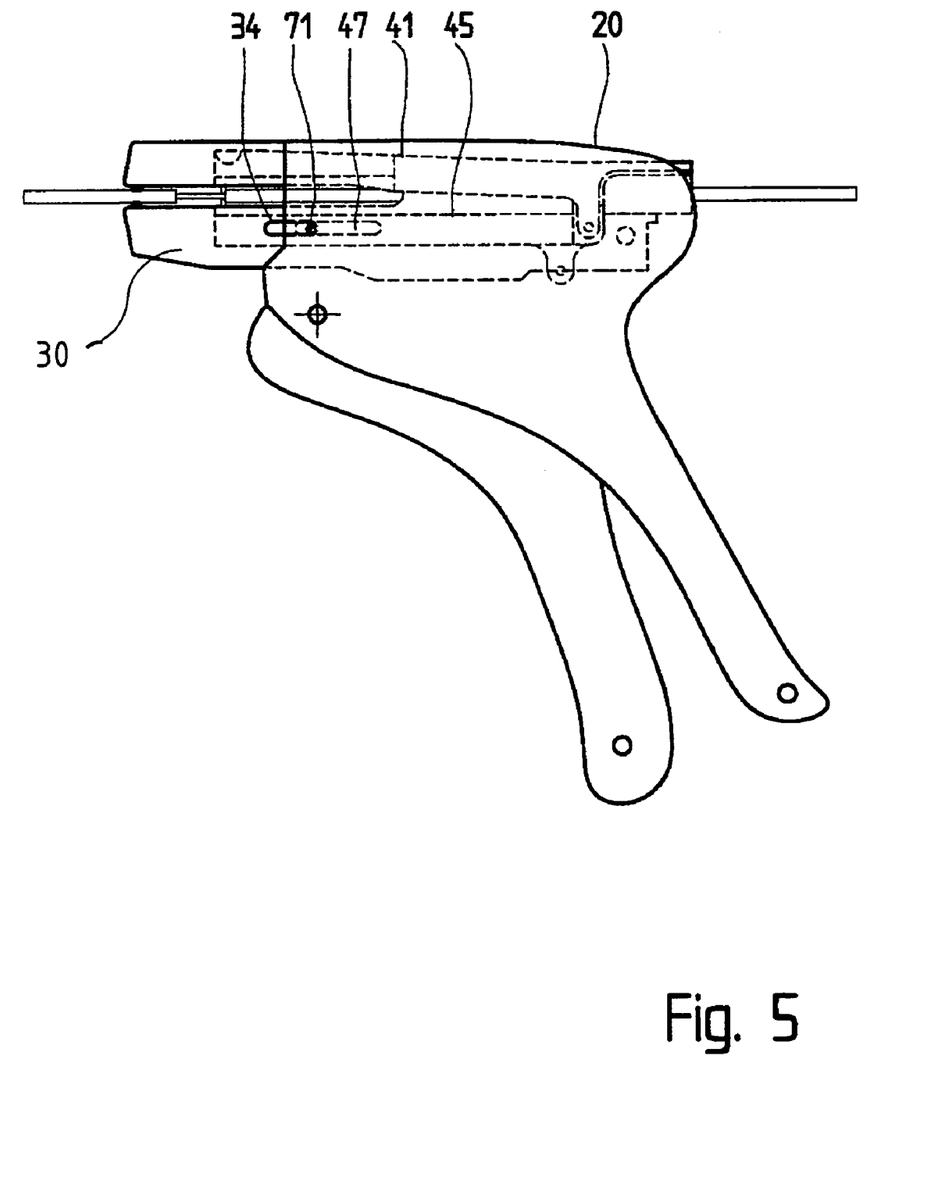
FIG. 5 is a side view of the stripping pliers of FIGS. 1 to 3.

As FIG. 5 clearly shows, the clamping arm unit 30 exhibits at its side wall at least one elbow lever axis guide groove 34 (cf. FIG. 5) that limits the travel of a first elbow lever end axis 71 in certain operational positions. At its bottom side, the clamping arm unit 30 is designed with a sliding seat for the stop element and a guide link for a knife unit guide roll.

The handle lever unit 60 exhibits at the articulated handle lever joint 61 a stop bolt 62. This is a fixed stop for the stop element 50 of the elbow lever unit 70. The stop bolt 62 can be connected to the handle lever unit 61 in a fixed manner cylindrically as a rigid axis, or it is arranged rotatably around the articulated handle lever joint 61.

A handgrip section 64 is formed at the end opposite the handle lever joint 61. Length and curvature are selected and matched to the handgrip section 64 of the base housing 20 such that the stripping pliers 100 subject to the invention can be held and operated easily by the user.

The handle lever unit 60 with the elbow lever axis guide groove 66, which is advantageously surrounded by an elevated guide strip 65, exhibits a slide guide for an elbow lever center axis 73.

At the handle lever unit 60, a spring element 80 is additionally articulated at an articulated spring element bearing 63. The spring element 80 consists essentially of an upper and a lower spring support element 81, 82, which are located on the same center axis and have a compression spring located between them. The upper spring support element 81 is articulated at the knife unit 40 via a spring element receiving axis 48.

Fundamentally, the knife unit 40 is comprised of a lower knife carriage 45 and a knife holder 41 articulated on said carriage. At their free ends, the knife carriage 45 and the knife holder 41 each exhibit at least one knife element 43, 46, that can, at least partially, cut through the synthetic jacket of an electrical cable 1. The knife carriage 45 and the knife holder 41 are connected in an articulated manner via a knife unit joint 44. In the area of the knife unit joint 44, the knife holder 41 is designed with a U-shaped cross-section, whereby the open end of the cross-section points down in the direction of the knife carriage 45. This creates an interim space between the upper side of the knife carriage 45 and the bottom side of the wall of the knife holder 41 shown sectionally in FIG. 1, where the cable 1 can be fed through. Molded onto the bottom side of the knife carriage 45 is a joint receptacle in which a knife unit guide roll 49 is supported rotably. Preferably, the axis 48 of the knife unit guide roll 49 coincides with the articulated joint of the upper spring support element 81.

The knife unit guide roll 49 runs along the guide link 32 at the bottom side of the clamping arm unit 30. The guide link 32 is provided with locking notches, run-up slopes, etc. to control the movement of the knife unit 40 in relation to the clamping arm unit 30 as will be elucidated below.

A core component of the stripping pliers 100 according to the invention is in addition to the knife unit 40 with cable feed-through channel, the elbow lever unit 70 together with the stop element 50.

The elbow lever unit 70 is comprised of a first elbow lever 72 and a second elbow lever 75 that is articulated on the first elbow lever via an elbow lever center axis 73. The elbow lever center axis 73 is guided in a movable fashion in the elbow lever axis guide groove 66 of the handle lever unit 60 via an elbow lever guide roll 74.

The second elbow lever 75 with its second elbow lever end axis 76 is articulated at the knife unit 40; preferably, the second elbow lever end axis 76 and the knife unit joint 44 coincide. This has the effect that the force acting by the elbow lever 75 onto the knife unit 40 results only in a movement of the same in relation to the clamping arm unit 30, but not to an articulating movement of the knife carriage 45 in relation to the knife holder 41.

In this preferred embodiment, the first elbow lever 72 is guided with its first elbow lever end axis 71 both in the guide link 32 of the clamping arm unit 30 and in the elbow lever axis guide notch 47 of the knife unit 40. While the guide link 32 of the clamping arm unit 30 exhibits only a certain length and limits the movement range of the first elbow lever end axis 71, the elbow lever axis guide groove 47 of the knife unit 40 is designed with such a length that the knife unit 40 can be moved independent of the respective position of the first elbow lever end axis 71 across the entire possible travel path within the clamping arm unit 30.

The stop element 50 is articulated on the first elbow lever end axis 71. This stop element exhibits a support surface that is used to support the stop element 50 at the bottom side of the clamping arm unit 30. In addition, the stop element 50 exhibits a stop surface 52, which is at a slope towards the support surface and approximately vertical to the force vector of a force F applied by the user when operating the handgrips 24, 64.

Figure 2:
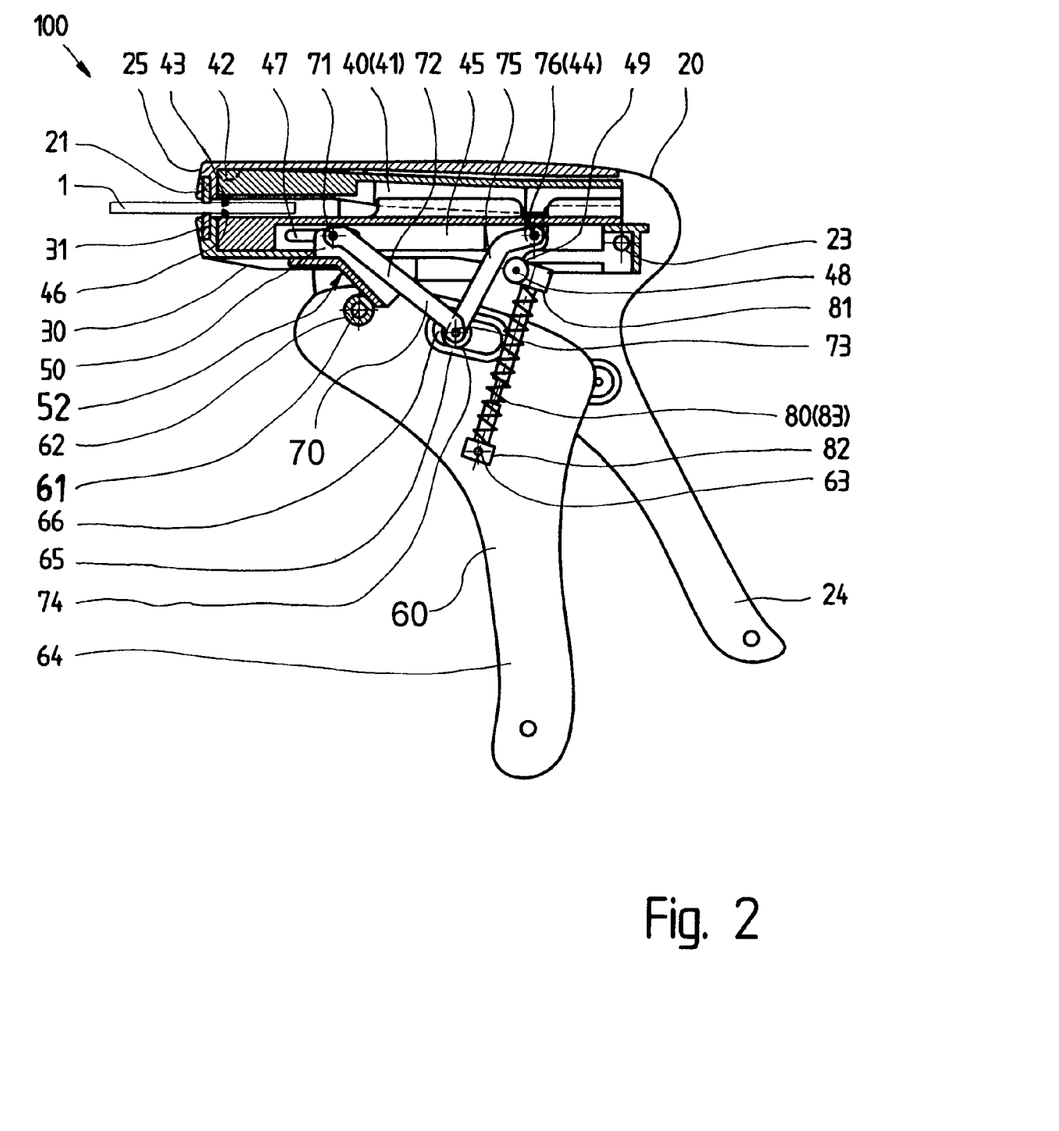
Figure 3:
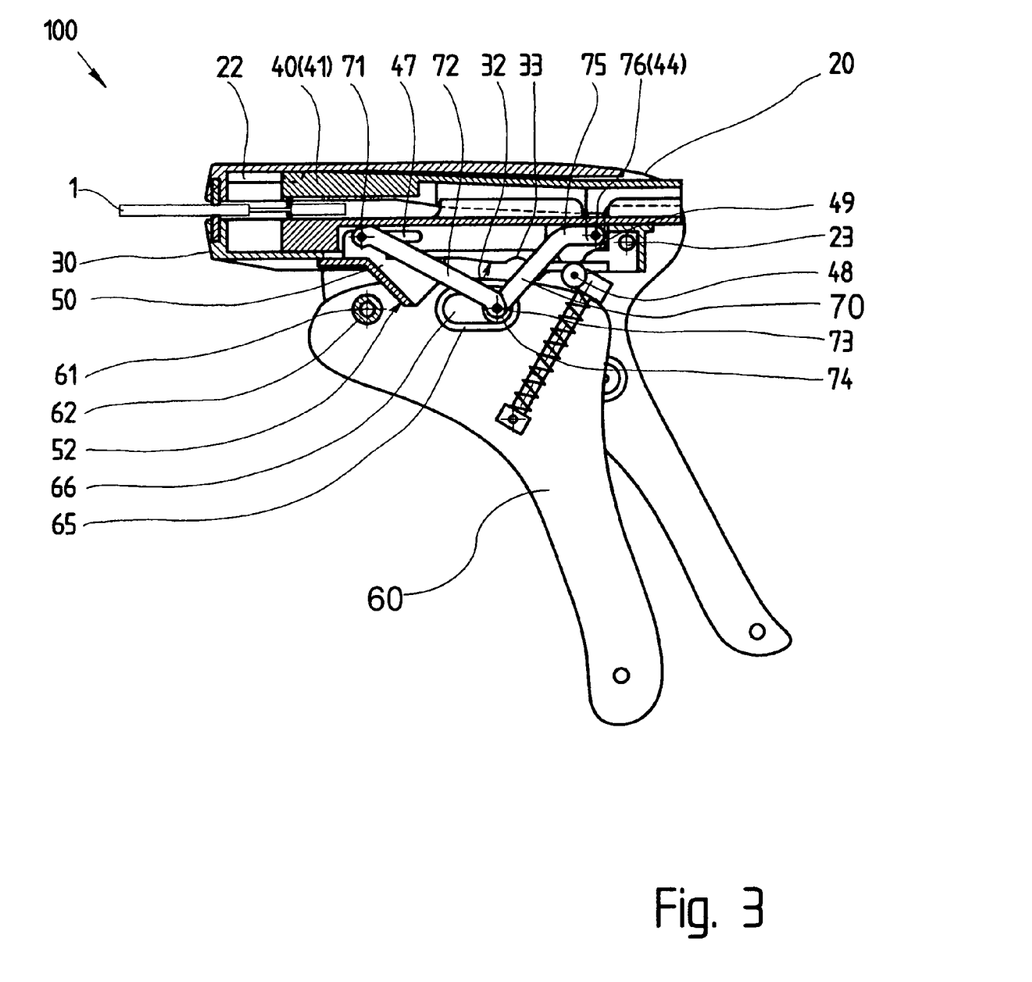

The kinematics subject to the invention is explained below based on the movement sequence when stripping an electrical cable as shown in FIGS. 1 to 3:

FIG. 1 shows a possible starting position, where the clamping arm unit 30 with its clamping jaw 31 is spread apart from the clamping arm 25 with the clamping jaw 21 of the base housing 20, and the knife holder 41 is spread apart from the knife carriage 45, such that the two knife elements 43, 46 are at a certain distance opposite each other. It is now possible to insert a cable 1 between the clamping jaws 21, 31 and the knife elements 43, 46, and that at any length, for example, as shown in FIG. 1, relatively short for full stripping of the individual wires at their ends, or for removing the outer jacket of the cable at a greater distance from the cable end.

With the stripping pliers 100 according to the invention, it is possible to push the cable 1 through the entire knife unit 40 and past the two articulating axis joints 44 located on the outside until the cable 1 exits from the back of the base housing 20. In this manner, the outer jacket can be cut at a great distance from the end of the cable.

At the starting position shown in FIG. 1, the hand grip 64 is also spread apart of the base housing 20 with its hand grip 24 due to the force of the spring 83. In its most forward position, the knife unit 40 is located within the clamping arm unit 30 or the base housing 20, respectively. At this position, the knife unit guide roll 49 engages in a locking notch 33 of the guide link 32 at the bottom side of the clamping arm unit 30; the locking notch 33 can be recognized in FIG. 3.

The slanted position of the elbow lever axis guide groove 66 has the effect that at a maximum spread of the grip lever unit 60 according to FIG. 1, the elbow lever center axis 73 is pulled into the right area of the groove 66 via the elbow lever guide roll 74 that runs in the elbow lever axis guide groove 66. Through this, the first elbow lever end axis 71 with the stop element 50 is pulled back at the same time via the first elbow lever 72. The stop surface 52 of the stop element 50 maintains a distance to the stop bolt 62.

When operating the stripping pliers 100 according to the invention, the handle lever unit 60 is pivoted toward the base housing 20 around the handle lever joint 61. A force is applied to the knife unit guide roll 49 via the spring element 80, and is pressed into the locking notch 33 of the guide link 32 by this force. Via the knife unit guide roll 49, the second elbow lever end axis 76 is at the same time temporarily fixed in the locking notch, because a fixed connection is established between the axes 44 and 48 via the knife carriage 45.

At the same time, when operating the handle lever unit 60, a force is applied to the elbow lever guide roll 74 at the elbow center axis 73 via the guide strip 65 at the elbow lever axis guide notch 66. Because the second elbow lever axis 76 is in this phase still fixed as described above, the first elbow lever 72 makes an evasive movement to the left. Through it, the stop element 50 is pushed further forward, i.e., in the direction of the clamping jaws 21, 31 until the stop surface 52 rests on the stop bolt 62.

This condition is shown in FIG. 2: The clamping jaws 21, 31 clamp the inserted cable 1 at its outer circumference. The blades of the knife elements 43, 46 have entered the jacket of the cable 1 and have cut the jacket at least partially. To this end, the position of each of the blade edges of the knife elements 43, 46 is selected such that they protrude only slightly past the clamping jaws 21, 31 toward the inside into the angle formed between the knife carriage 45 and the knife holder 41. This ensures that even cables that are provided with a very thin jacket are not cut by the knife elements 43, 46, and that only the outer jacket is removed without the copper strands being cut by the knives. Cutting into the jacket at the circumference is sufficient to tear off the jacket portion with only minimal application of force for the typical electrical cable PVC jackets, and thus achieve the full separation of the jacket.

Tearing off is accomplished through the backwards movement of the knife unit 40 as the third significant phase of movement, whereby the knife elements 43, 46 remain engaged with the jacket, and the cable 1 remains clamped next to the knife elements 43, 46 by the clamping jaws 21, 31.

The third operating phase starts with the situation shown in FIG. 2, whereby the knife unit 40 is still located in its front most position near the clamping jaws 21, 31, and whereby the stop surface 52 is supported at the stop bolt 62. Now, a movement of the stop element 50 is no longer possible, such that the end axis of the first elbow lever 71 is fixed via the stop element 50.

The force applied to the elbow lever center axis 73 also acts upon the second elbow lever 75, and thus upon the knife unit joint 44. In the course of the operation of the handle lever unit 60, the force acting upon the second elbow lever 75 and the knife unit 40 rises due to the first elbow lever 72, which is fixed via the stop element 50, to an extent that the knife unit guide roll 49 is pressed out of the locking notch 33 and the knife unit 40 is pushed backwards in the clamping arm unit 30.

The part of the jacket of the cable 1 that is to be removed is pulled backwards with the movement of the knife unit 40 and is fully torn off. This results in the situation shown in FIG. 3.

Upon release of the hand grip section 64, the handle lever unit 60 is returned to its initial position due to the force of the compression spring 83, whereby the clamping arm unit 30 is spread apart from the upper clamping arm 25 of the base housing 20; the same applies to the knife holder 41 in relation to the knife carriage 45. The processed cable 1 can now be removed from the opened stripping pliers 100.

The separated portion of the jacket has been automatically pulled off completely, if the length to be stripped is not longer than the maximum possible return path length of the knife unit 40. Otherwise, the end of the jacket to be removed has been pulled back enough such that the user can easily grab it and pull it off the cable end.

A knife holder guide groove 22 can be recognized in FIG. 3 in which a guide cam 42 runs that has been molded onto the outside of the knife holder 41. This has the effect that the knife holder 41 moves at a pre-specified path in the base housing 20 and that the knife holder 41 does not need to be spread apart from the knife carriage 45 through additional springs, etc.

The specific advantage of the invention is achieved through the elbow lever unit 70. In all operational phases, a force is transferred via the elbow levers 72, 75 leading to the closing of the clamping jaws 21, 31, or the pressing together of the knife elements 43, 46, respectively, and maintaining the clamping action also during the subsequent operational steps; i.e., a sufficient clamping force is created via the elbow lever unit 70 that the cable 1, which is clamped between the clamping jaws 21, 31, is not moved during the return movement of the knife unit 40. Together with the clamping force, the force for the complete tearing off and pulling off of the jacket is applied via the elbow lever unit 70. Force peaks lead to the initiation of the next phase of the movement, such that the forces acting upon the cable are limited by design.

Figure 4:
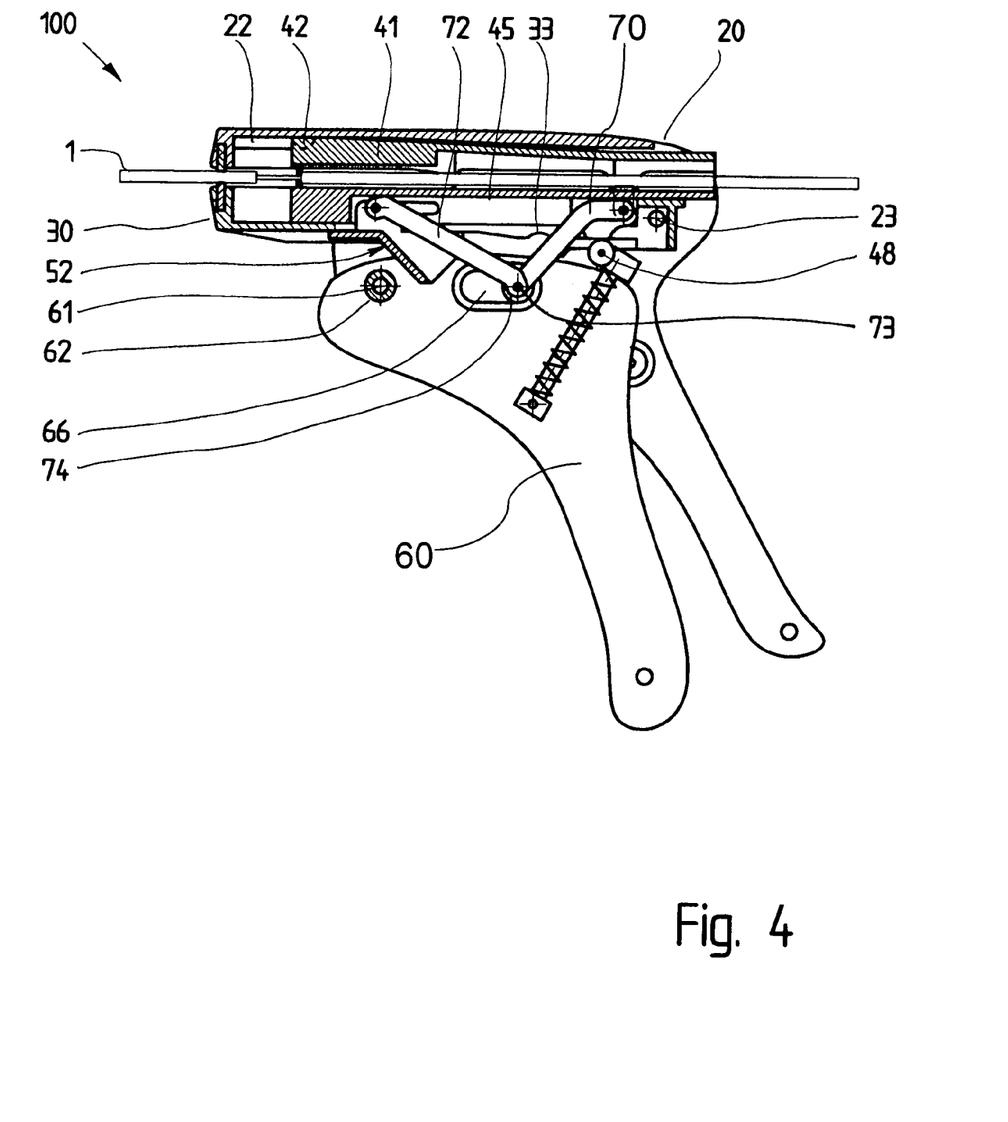
FIG. 4 shows the stripping pliers according to FIGS. 1 to 3 with a long cable end.

FIG. 4 shows how a long cable end is fed through the stripping pliers 100, in particular through the pliers' knife unit 40. Also recognizable is the elbow lever axis guide groove 34 in the clamping arm unit 30 (see FIG. 5) by which the travel of the first elbow lever end axis 71 and with it, the travel of the stop element 50 is limited. Important is, in particular, the limiting of the forward movement of the first elbow lever end axis 71, because this prevents too great a clamping force from acting upon the clamping jaws 21, 31, which would squeeze off very thin cables.

Figure 6:
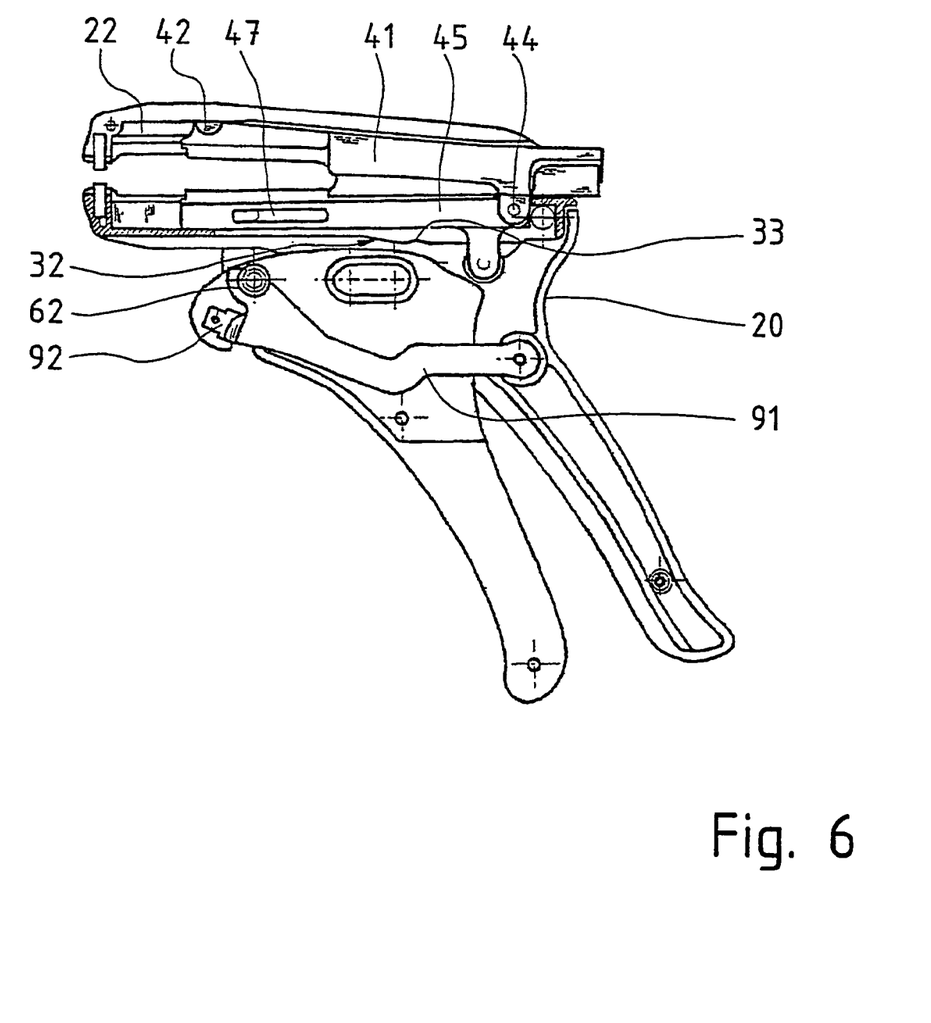
FIG. 6 is a side cross-sectional view of another preferred embodiment of the stripping pliers with a cable cutter.

FIG. 6 shows another preferred embodiment with an additional cable cut-off device. It is formed by a knife holder 91 that is positively connected to the base housing and a blade 92 that is attached to the handle lever unit 60. When pivoting the handle lever unit 60 around the handle lever joint 61, the blade 92 is moved toward the fixed knife holder 91. A cable placed between these parts will be fully cut. The knife holder 91 is preferably fixed to the stop bolt 62 as well as to another point at the base housing 20, which can be freely selected as long as it does not interfere with the operation of the user and does allow a free movement of the elbow lever unit 70 and of the spring element 80. For the sake of clarity, the elbow lever unit 70, the spring element 80 and the stop element 50 are not shown in FIG. 6.

Figure 7:
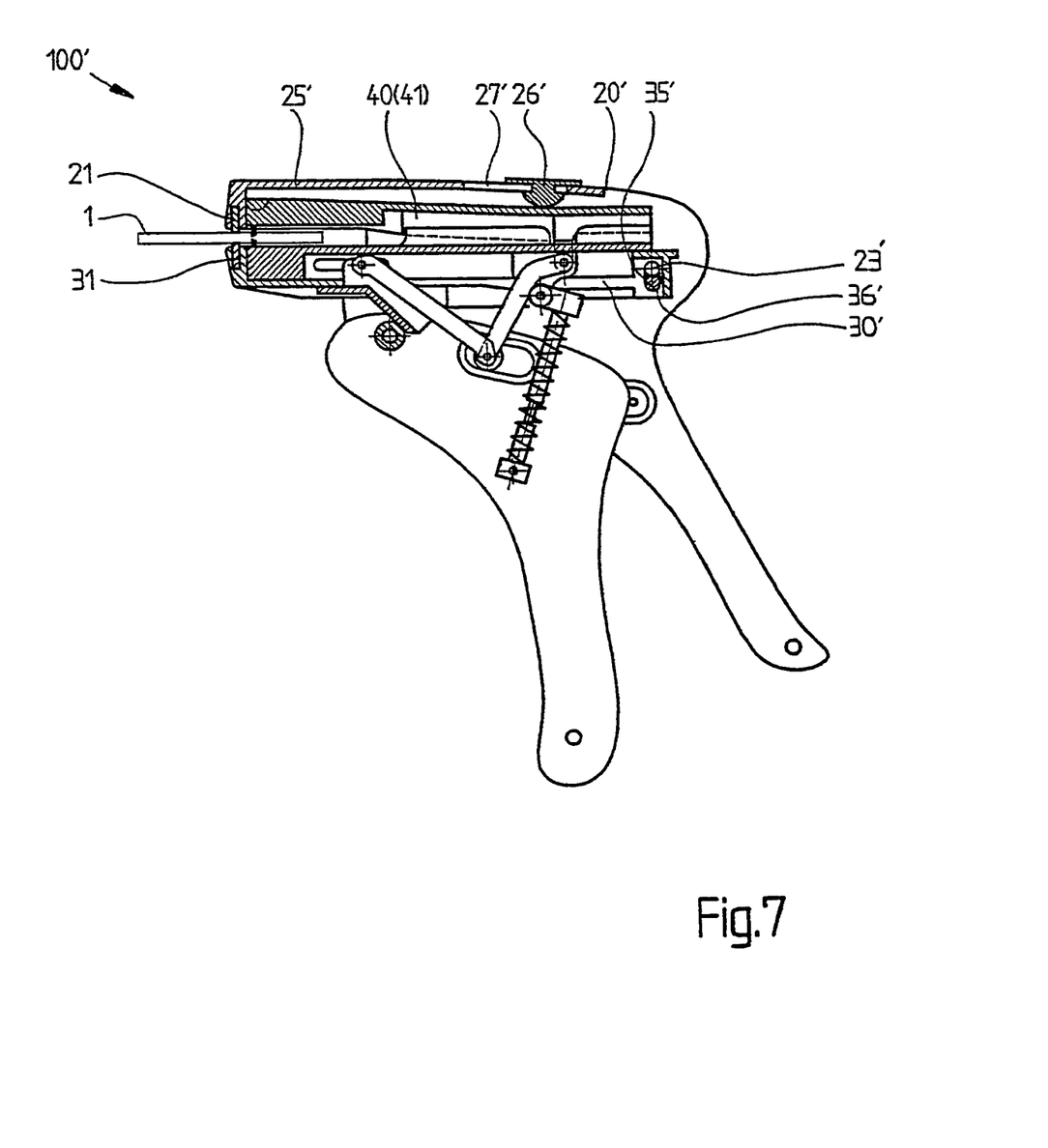
FIG. 7 is a cross-sectional side view of still another preferred embodiment of stripping pliers according to the invention.

FIG. 7 shows still another preferred embodiment of stripping pliers 100', where the clamping arm 25' of the housing 20' exhibits a pressure point element 26', which is located opposite the upper side of the knife unit 40 and is guided in a movable fashion in a pressure point element guide groove 27'.

Through the pressure point element 26', the pressure point against which the knife unit 40 is pressed when operating the stripping pliers, can be defined and changed, in a first phase when the knife holder 41 and the knife carriage 45 as well as the clamping jaws 21, 31 are moved toward each other under inclusion of a cable 1 placed between them. The knife unit 40 presses, depending on the position of the pressure point element 26' somewhat earlier or somewhat later in its movement against this created pressure point. In this manner, the knife unit 40 is fixed at the front at the knife elements and further back at the pressure point element 26'. At the same time, the clamping arm unit 30' is also fixed at the front at the clamping jaws 21, 31 and indirectly via the knife unit 40 at the pressure point element 26'.

A further increasing force, when operating the stripping pliers 100', is guided to the blocked clamping arm unit 30' via the knife unit guide roll 49, and results in the knife unit guide roll 49 being pushed out of the locking notch 33 (cf. FIG. 4), which triggers, as has already been explained above, the return movement of the knife unit 40 leading to the pulling off of the cut off cable jacket.

To reduce the bending stress of the clamping arm unit 30, in particular between the moment of blocking of the clamping arm unit 30' by placing the knife unit 40 against the pressure point element 26' and the start of the return movement of the knife unit after the knife unit guide roll 49 has been pushed out of the locking notch, the articulated clamping arm bearing 23', is formed by an axis connected to the base housing 20' where said axis rests on a damping element 35' in the clamping arm unit 30'.

The elastomeric damping element 35' is preferably located underneath the axis in an elongated hole 36' in the clamping unit 30' and cushions load peaks. The additional damping can be provided for both the first shown embodiment of the stripping pliers 100 and the embodiment of the stripping pliers 100' with the pressure point.

There has thus been shown and described a novel automatic wire stripper which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. Automatic stripping pliers, especially suitable for stripping flat cables, said pliers comprising, in combination:
    a knife unit, having at least one knife holder and a knife carriage articulated on said knife holder;
    a clamping arm unit with at least one clamping jaw located at its front end;
    a base housing with
        one upper clamping arm, in which the knife unit is guided in a movable fashion,
        at least one clamping jaw,
        a clamping arm bearing on which the clamping arm unit is articulated;
    a handle lever unit, which is articulated at an articulated handle lever bearing with the base housing; and
    an elbow lever unit consisting of a first and a second elbow lever arm that are articulated relative to one another via an elbow lever center axis, wherein
        the first elbow lever arm is guided with a first elbow lever end axis in a guide link of the clamping arm unit,
        the second elbow lever is articulated at the knife unit, and
        the elbow lever center axis is guided in the handle lever unit.

2. Stripping pliers as set forth in claim 1, wherein the knife unit is supported in a movable fashion in the clamping arm unit.

3. Stripping pliers as set forth in claim 1, wherein the base housing includes a hand grip section.

4. Stripping pliers as set forth in claim 1, wherein the handle lever unit includes at least one elbow lever axis guide groove, a spring element bearing and a stop bolt.

5. Stripping pliers as set forth in claim 4, further comprising a stop element, which can be moved with the first elbow lever end axis in relation to the clamping arm unit and rests on the stop bolt with the stop surface.

6. Stripping pliers as set forth in claim 4, wherein the first elbow lever arm with the first elbow lever end axis is supported in a movable fashion in the elbow lever axis guide groove of the clamping arm unit.

7. Stripping pliers as set forth in claim 4, wherein the elbow lever center axis is guided in the elbow lever axis guide groove of the handle lever unit.

8. Stripping pliers as set forth in claim 1, wherein at least one of the knife holder and the knife carriage includes a U-shaped cross-section at least in the area of an articulated axis and whereby a cable feed-through channel is created between the knife carriage and the knife holder.

9. Stripping pliers as set forth in claim 4, wherein the elbow lever center axis is supported in the elbow lever axis guide groove in a rollable fashion via an elbow lever guide roll.

10. Stripping pliers as set forth in claim 4, wherein a guide edge of the elbow lever axis guide groove includes a thickening guide strip.

11. Stripping pliers as set forth in claim 1, wherein the knife carriage exhibits an elbow lever axis guide groove across a portion of its length, which is at least partially covered by the elbow lever axis guide groove of the clamping arm unit.

12. Stripping pliers as set forth in claim 1, wherein the clamping arm unit includes, at its lower side, a guide link on which the knife unit is guided via a knife unit guide roll.

13. Stripping pliers as set forth in claim 12, wherein the guide link includes at least one locking notch.

14. Stripping pliers as set forth in claim 12, wherein the knife unit guide roll is supported at a spring receiving joint.

15. Stripping pliers as set forth in claim 1, wherein a second elbow lever end axis is located in the articulated axis of the knife unit.

16. Stripping pliers as set forth in claim 1, wherein the knife carriage and the knife holder are provided with replaceable knife elements.

17. Stripping pliers as set forth in claim 1, wherein the upper clamping arm and the clamping arm unit are provided with replaceable clamping jaws.

18. Stripping pliers as set forth in claim 1, wherein a knife blade is located at the handle lever unit, with said knife blade moving with a pivoting movement of the handle lever unit against a fixed knife element in the base housing.

19. Stripping pliers as set forth in claim 1, wherein the upper clamping arm includes a pressure point element that is guided in a pressure point element guide groove and that is located opposite the upper end of the knife unit.

20. Stripping pliers as set forth in claim 1, wherein the articulated clamping arm bearing is formed by an axis that is connected with the base housing and that rests against a damping element located in the clamping arm unit.

21. Stripping pliers as set forth in claim 20, wherein the damping element is located underneath the axis in an elongated hole in the clamping arm unit.

* * * * *